United States Patent [19]

Vick, Jr.

[11] Patent Number: 5,000,472

[45] Date of Patent: Mar. 19, 1991

[54] KINGPIN ASSEMBLY

[76] Inventor: Henry L. Vick, Jr., 24-7 Westchester Ct., Birmingham, Ala. 35215

[21] Appl. No.: 452,067

[22] Filed: Dec. 18, 1989

[51] Int. Cl.$^5$ ............................................. B62D 53/08
[52] U.S. Cl. .................................. 280/420; 280/434; 280/438.1
[58] Field of Search ..................... 280/425.1, 420-422, 280/438.1, 433, 434

[56] References Cited

U.S. PATENT DOCUMENTS

| 2,480,483 | 8/1949 | Kirksey | 280/434 |
| 3,278,198 | 10/1966 | Tantlinger | 280/433 |
| 3,391,950 | 7/1968 | Carter | 280/421 |

FOREIGN PATENT DOCUMENTS 3512977 10/1986 Fed. Rep. of Germany ... 280/438.1

Primary Examiner—Charles A. Marmor
Assistant Examiner—Victor E. Johnson
Attorney, Agent, or Firm—Jennings, Carter, Thompson & Veal

[57] ABSTRACT

An improved kingpin includes a shaft pivotally secured within a bearing and mounted within a trailer, the kingpin being positioned in downward extension therefrom for secured engagement within a conventional fifth-wheel. Also included are couplers for automatically connecting a tractor's service lines to the trailer concurrent with the engagement of said kingpin within said fifth-wheel.

7 Claims, 4 Drawing Sheets

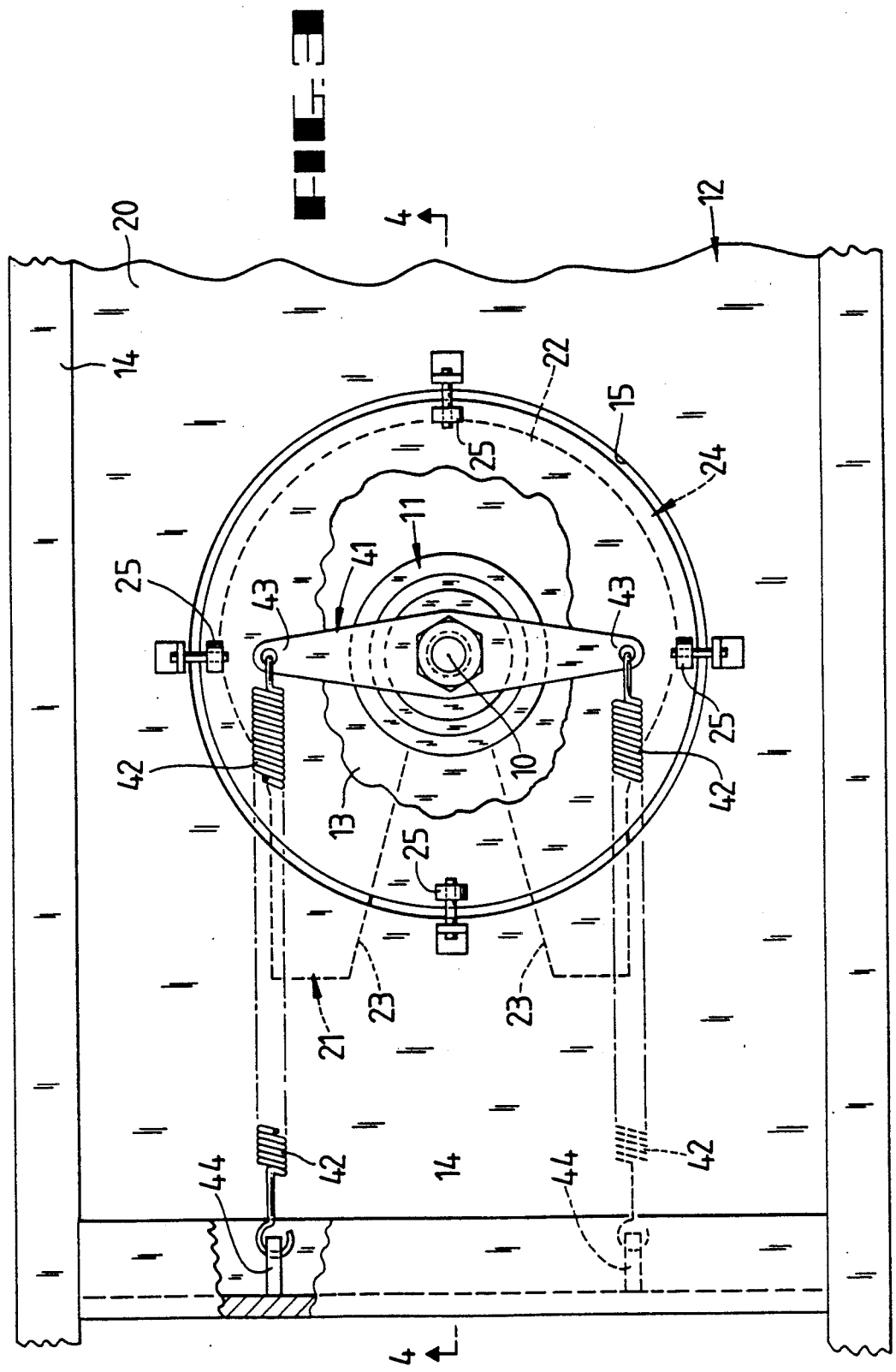

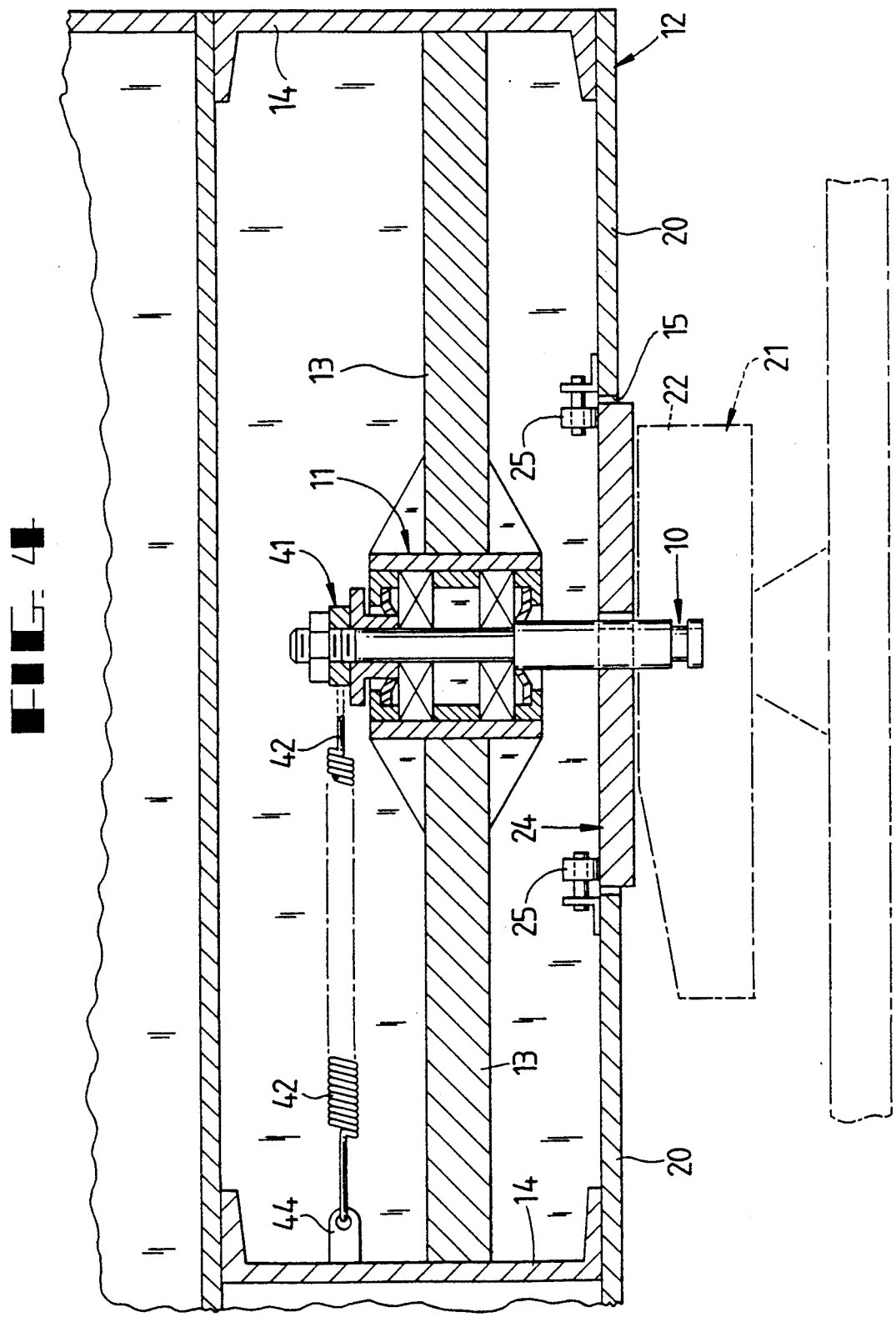

KINGPIN ASSEMBLY

FIELD OF THE INVENTION

The present invention relates to connective devices commonly known as kingpins, which are generally located on a trailer and are used to connect such trailers to a conventional fifth-wheel located on the frame of a tractor. More particularly the present invention relates to improvements in a kingpin which allow automatic and secure connection of the control lines between the tractor and trailer and which permit the trailer to pivot about the kingpin in nonfrictional engagement with the tractor's fifth-wheel thereby eliminating the need for lubrication typically applied to such fifth-wheels.

BACKGROUND OF THE INVENTION

A tractor-trailer rig typically utilizes a kingpin rigidly affixed to the trailer frame for connecting the trailer to a tractor. The kingpin is a vertically oriented shaft that extends downward from the forward end of the trailer and is engaged for pivotal movement within a conventional fifth-wheel located on the frame of a tractor. Typical fifth-wheels include a horizontally oriented deck plate on which the forward end of the trailer rests, defining an inwardly converging receiver wherein the king pin is secured. The upper surface of the fifth-wheel must be greased to facilitate the pivotal movement of the trailer on the fifth-wheel, such pivotal movement being necessary to accommodate the steering of the tractor-trailer rig. The greasing of a fifth-wheel is a time consuming operation that must be continually repeated The grease applied to the fifth-wheel will not remain on the fifth-wheel and tends to drip onto the tractor's frame or onto the highway Many state law enforcement agencies currently fine truck drivers either for not having a sufficient amount of grease on the fifth-wheel which makes for unsafe turning of the vehicle or for having too much grease such that grease drips onto the road surface creating a hazard for other drivers. Even if the driver maintains a sufficient amount of grease on the fifth-wheel, turning of the rig about a corner or the like, creates a substantial amount of friction between the planar contact of the fifth-wheel and the trailer. This friction resists the pivotal motion about the kingpin which in turn wears the tread from the tractor's front tires Also associated with the connection of the tractor to the trailer is the use of what are called pigtails. These pigtails are flexible connector lines connected to a tractor's pneumatic, hydraulic or electrical systems to operatively connect such systems to the trailer Current practice requires the operator to manually locate the pigtails and properly connect them. This requires the driver to get out of the tractor and perhaps climb onto or beneath the rear of the tractor to make such a connection. Such areas of a tractor are very greasy, making the typical connection of pigtails an unpleasant experience

SUMMARY OF THE INVENTION

It is the principal object of the present invention to provide a kingpin which connects a trailer to a tractor's fifth-wheel without requiring lubrication of the fifth-wheel or the kingpin.

Yet another object of the invention is to provide automatic connection between the tractor and trailer control systems concomitant with engagement of the kingpin within the fifth-wheel.

Yet another object of the invention is to reduce the amount of friction between a tractor and its trailer during turning thereby reducing road wear on the vehicle's tires.

These and other objects and advantages of the invention are accomplished through the use of a kingpin mounted for pivotal movement about a vertical axis in a bearing assembly. The bearing assembly is suspended within the trailer by a plurality of braces which are connected intermediate the trailer's frame and the bearing assembly with the pivotal kingpin extending downward from the trailer for engagement with a fifth-wheel. The kingpin includes a circular contact plate connected to and radially extending from the pivotal kingpin When the trailer and tractor are connected, the contact plate rest in planar abutment atop the upper surface of the fifth-wheel in non-pivoting relation thereto As the tractor-trailer rig turns, the kingpin and contact plate remain motionless in relation to the truck's fifth wheel while the trailer pivots on the bearing assembly. Electrical, pneumatic and hydraulic connective members supported beneath the contact plate are inserted in operative connection within electrical, pneumatic and hydraulic receptacles mounted on the fifth-wheel concomitant with the engagement of the kingpin within such fifth-wheel, thereby operatively connecting the tractor's control systems to the trailer.

BRIEF DESCRIPTION OF THE DRAWINGS

Apparatus embodying features of my invention are depicted in the accompanying drawings which form a portion of this disclosure and wherein:

FIG. 3 is a plan view of the second embodiment of the present invention; and

FIG. 4 is a partial sectional view of FIG. 3 taken along line 4—4 of FIG. 3.

DESCRIPTION OF A PREFERRED EMBODIMENT

Figure 1:
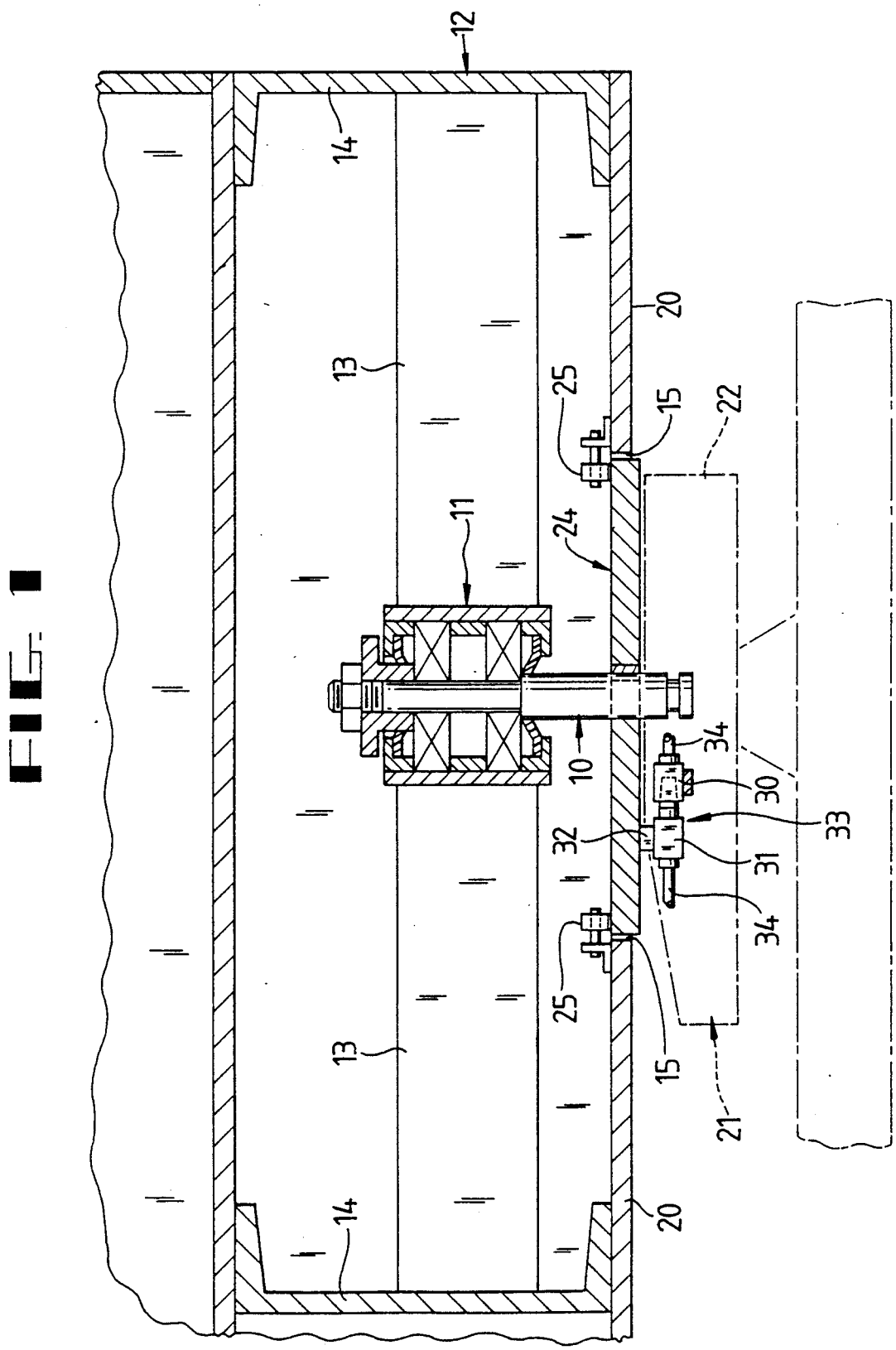
FIG. 1 is a partial sectional side view of the present invention in engagement with a conventional fifth-wheel.
Figure 2:
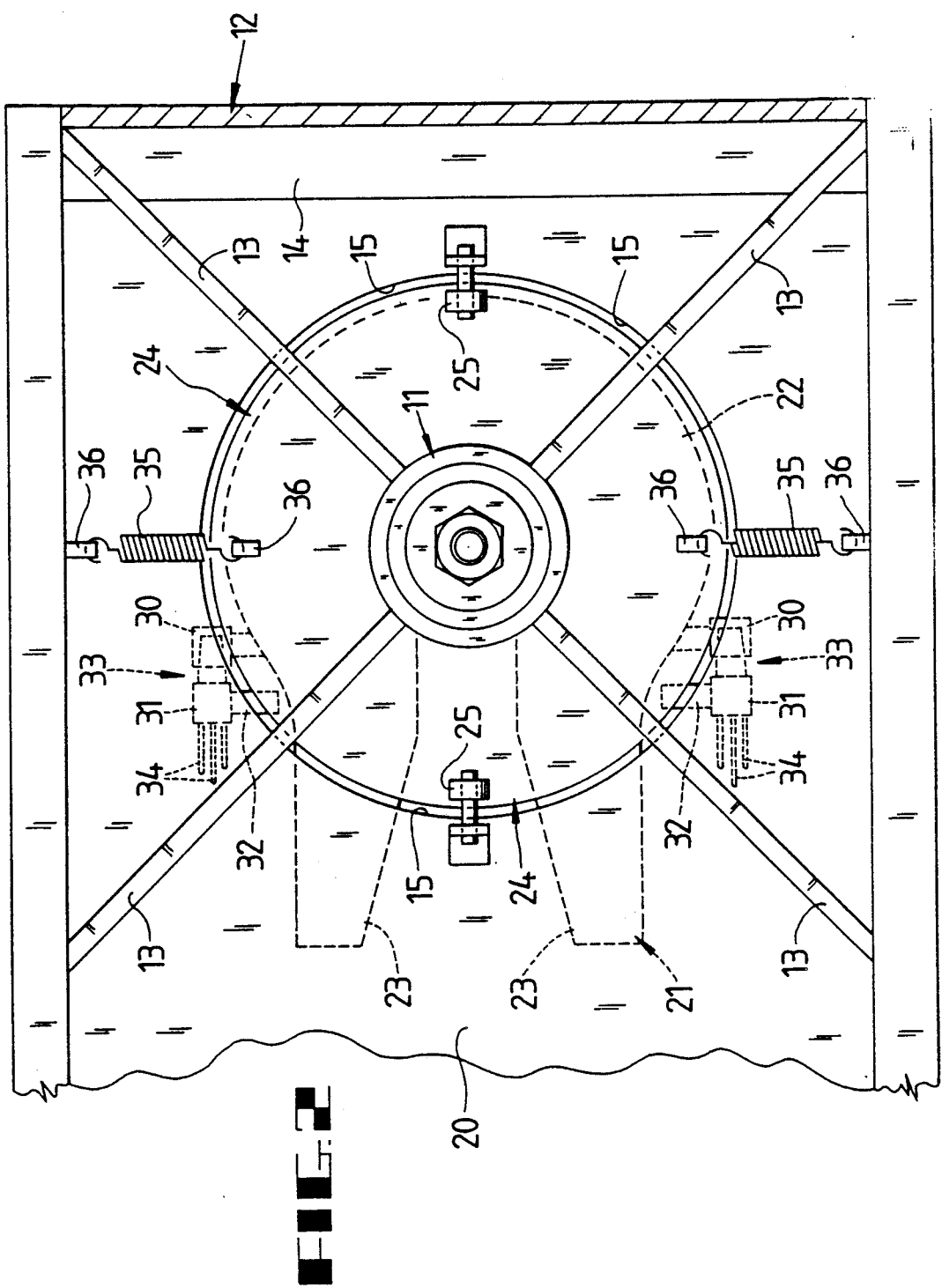
FIG. 2 is a plan view of the first embodiment of the present invention.

Referring to FIG. 1 of the drawings for a clearer understanding of the invention, it should be noted that the preferred embodiment of the present invention contemplates the use of a kingpin 10 mounted within a bearing assembly 11 for pivotal movement about a vertical axis. As shown in FIGS. 1 and 2, the bearing assembly 11 is suspended within a trailer 12 by four braces 13 connected intermediate the bearing assembly 11 and the trailer's frame members 14. The kingpin 10 extends downwardly from the bearing assembly 11, through a circular opening 15 in a bottom plate 20 of the trailer 12 for detachable engagement within a fifth wheel 21. The fifth wheel 21 includes the upper portion referred to as a deckplate 22. As shown in FIGS. 1-2, a circular contact plate 24 is connected to and radially extends from the kingpin 10. The circular plate 24 is horizontally oriented in coplanar suspension within the circular opening 15, with the marginal edge of such circular plate 24 extending in close proximity to the defining edge of the opening 15. Rollers 25 are connected to the bottom plate 20 of trailer 12 in spaced relation about opening 15 and in rolling abutment with the upper surface of the contact plate 24. The rollers 25, in their abutment with the contact plate 24, maintain the plate 24 in coplanar alignment with bottom plate 20. When the kingpin 10 is engaged within the fifth wheel 21, the contact plate 24 rests atop the fifth wheel 21. When engaged by the fifth wheel 21, the kingpin 10 and the circular plate 24 remain stationary thereon. The weight of the trailer is supported partially by the kingpin 10 in its secured position within the bearing assembly 11 and partially by the circular contact plate's 24 abutment with rollers 25. Mounted to the fifth wheel 21 in rearward extension therefrom are a pair of receptacles 30 for receiving in operative engagement a corresponding pair of connective members 31 which are mounted on the lower surface of the circular contact plate by mounting brackets 32 which are connected to and extend a predetermined distance below the contact plate 24. The receptacles 30 and the connective members 31 form a pair of couplers 33 used to operatively connect pneumatic, hydraulic and electric service lines 34 which extend between the tractor and the trailer The connective members 31 slide within the receptacles 30 in operative connection therein as the kingpin 10 is received by a tapered slot 23 defined within the fifth wheel 21. As the kingpin 10 is engaged in the forward portion of the tapered slot 23, the connective members 31 are positioned in complete operative engagement within the receptacles 30. Prior to insertion, the connective members 31 are biased into opposing alignment with the receptacles 30 by a pair of springs 35, each spring 35 being connected intermediate a pair of lugs 36 which are connected to the frame member 14 of the trailer 12 and the upper surface of the contact plate 24. When the trailer is disengaged from the tractor, the springs 35 bias the contact plate 24, and consequently the connective members 31 mounted thereon, such that the connective members 31 are biased to extend in parallel alignment with the longitudinal axis of the trailer. To connect the trailer to the tractor, the tractor is backed toward the front of the trailer with the tractor in longitudinal alignment with the trailer. The receptacles 30 receive the connective members 31 as the tapered slot 23 engages the kingpin 10. When the tractor-trailer combination is mobile the trailer 12 will pivot around the kingpin 10 which remains motionless in relation to the fifth wheel 21.

In FIGS. 3 and 4, an alternative embodiment of the invention is shown. This embodiment utilizes a lever arm 41 connected atop said kingpin 10 in perpendicular extension on either side thereof Alternate springs 42 connected intermediate the extended portions 43 of the lever arm 41 and lugs 44 located on the frame members 14 bias the lever arm 41, kingpin 10, and consequently the contact plate 24 and connective members 31 into a position in which the connective members 31 are aligned for insertion within receptacles 30 as described in the preferred embodiment. As shown in FIG. 3, the alternate springs 42 are positioned parallel to one another in longitudinal extension toward the rear of the trailer 14, and in perpendicular extension from the lever arm 41.

It should be understood that the bearing assembly 11 described hereinabove is preferentially a sealed greaseless bearing which needs no replenishment of its lubricant. With such a bearing in place, it should be evident that I have devised a kingpin which eliminates the need for greasing the fifth-wheel of a tractor. The use of a bearing also reduces the amount of friction wear tractor-trailer tires are subjected to during turning by reducing the amount of friction at the pivotal connection point of the tractor and the trailer.

While I have shown my invention in two forms, it will be obvious to those skilled in the art that it is not so limited but is susceptible of various changes and modifications without departing from the spirit thereof.

What I claim is:

1. A kingpin secured to a trailer frame for detachable engagement with a conventional fifth wheel typically connected to a tractor frame, said tractor frame having fluid and electrical lines connected thereto for supplying energy to said trailer frame comprising:
    (a) a downwardly extending shaft mounted to said trailer frame for pivotal movement about a vertical axis;
    (b) a circular contact plate connected to said pivotal shaft in radial extension therefrom for planar engagement atop a fifth wheel on a tractor;
    (c) means attached to said contact plate and said fifth wheel for automatically connecting said fluid and electric service lines of said tractor with said trailer, wherein said means for automatically connecting has a pair of male connectors mounted to said contact plate and a pair of female receptacles mounted to said fifth wheel; and
    (d) means connected to said tractor frame for aligning said connective members in opposition to said receptacles, wherein said aligning means comprises two spring members each connected intermediate said trailer frame and said contact plate, wherein said spring members bias said contact plate and consequently said connective members mounted thereon, said connective members being positioned in opposing alignment with said receptacles for insertion therein.

2. A kingpin secured to a trailer frame for detachable engagement with a conventional fifth wheel typically connected to a tractor frame, said tractor frame having fluid and electrical lines connected thereto for supplying energy to said trailer frame, comprising:
    (a) a downwardly extending shaft mounted to said trailer frame for pivotal movement about a vertical axis;
    (b) a circular contact plate connected to said pivotal shaft in radial extension therefrom for planar engagement atop a fifth wheel on a tractor;
    (c) means attached to said contact plate and said fifth wheel for automatically connecting said fluid and electric service lines of said tractor with said trailer, wherein said means for automatically connecting has a pair of male connectors mounted to said contact plate and a pair of female receptacles mounted to said fifth wheel; and
    (d) means connected to said tractor frame for aligning said connective members in opposition to said receptacles, wherein said aligning means comprises a lever arm connected to said pivotal shaft extending perpendicularly on either side thereof and a pair of springs each connected intermediate an extended end of said lever arm and said trailer frame, wherein said spring bias said lever arm and consequently said contact plate and said connective members mounted thereon into an aligned position for insertion of said connective members within said receptacles.

3. Apparatus for securing a trailer in pivotal engagement with a conventional fifth wheel mounted on a frame of a tractor, comprising:
  (a) means mounted to said trailer for connecting said trailer to said fifth wheel, said connecting means having a kingpin mounted to said trailer for pivotal movement about a vertical axis and extending downward for detachable engagement within said fifth wheel;
  (b) a circular contact plate connected to said kingpin in radial extension therefrom;
  (c) a pair of male connectors mounted to said contact plate;
  (d) a pair of receptacles mounted to said fifth wheel for receiving said male connectors therein; and
  (e) means connected to said trailer for biasing said contact plate and said male connectors in opposing alignment with said receptacles prior to the insertion of said kingpin within said fifth wheel, wherein said means for biasing comprises a pair of springs connected intermediate said trailer and said contact plate.

4. Apparatus for securing a trailer in pivotal engagement with a conventional fifth wheel mounted on a frame of a tractor, comprising:
  (a) means mounted to said trailer for connecting said trailer to said fifth wheel, said connecting means having a kingpin mounted to said trailer for pivotal movement about a vertical axis and extending downward for detachable engagement within said fifth wheel;
  (b) a circular contact plate connected to said kingpin in radial extension therefrom;
  (c) a pair of male connectors mounted to said contact plate;
  (d) a pair of receptacles mounted to said fifth wheel for receiving said male connectors therein; and
  (e) means connected to said trailer for biasing said male connectors in opposing alignment with said receptacles prior to the insertion of said kingpin within said fifth wheel, wherein said means for biasing comprises:
    i. a lever arm connected atop said kingpin and extending perpendicularly on either side thereof; and
    ii. two springs, each connected intermediate an extended end of said lever and said trailer.

5. Apparatus as described in claim 4 wherein said kingpin and said contact plate are aligned for pivotal movement about a vertical axis by a plurality of rollers connected to said trailer extending in rolling abutment with an upper surface of said contact plate.

6. Apparatus for pivotally connecting a trailer to a conventional fifth wheel for movement about a vertical axis, comprising:
  (a) a kingpin pivotally connected to said trailer and downwardly extending therefrom for rotation about a vertical axis;
  (b) a circular contact plate concentrically connected to said kingpin in radial extension therefrom, wherein said contact plate is suspended beneath said trailer on said kingpin; and
  (c) biasing means connected to said contact plate for biasing said contact plate to a predetermined rotational orientation relative to said trailer, wherein said biasing means comprises a lever connected to said kingpin and extending on either side thereof and two springs, each connected intermediate an extended end of said lever and said trailer.

7. Apparatus as described in claim 6 further comprising a plurality of rollers connected to said trailer in rolling abutment with an upper surface of said contact plate.

* * * * *